United States Patent [19]
Teller et al.

[11] 4,021,347
[45] May 3, 1977

[54] SEWAGE TREATMENT SYSTEM

[76] Inventors: Ray E. Teller, Sandbrook Road, R.D. 1, Stockton, N.J. 08559; Sem G. Zachar, Rte. 31, No. Box 470, Washington, N.J. 07882

[22] Filed: Jan. 9, 1976

[21] Appl. No.: 647,670

[52] U.S. Cl. .......................... 210/195 S; 210/199; 210/202; 210/203; 210/220; 210/314; 210/320; 210/411

[51] Int. Cl.² ..................... C02C 1/08; B01D 23/24

[58] Field of Search ................ 210/7, 15, 170, 192, 210/195 S, 197, 220, 221 R, 256, 260, 261, 446, 314, 315, 317, 199, 202, 203, 320, 411

[56] References Cited

UNITED STATES PATENTS

| | | | |
|---|---|---|---|
| 968,077 | 8/1910 | Ray | 210/314 |
| 2,901,114 | 8/1959 | Smith et al. | 210/15 X |
| 3,234,880 | 2/1966 | Hampton | 210/195 M X |
| 3,236,767 | 2/1966 | Ross et al. | 210/195 S X |
| 3,276,994 | 10/1966 | Andrews | 210/220 X |
| 3,476,250 | 11/1969 | Fifer | 210/220 X |
| 3,487,937 | 1/1970 | Koulovatos | 210/195 M |
| 3,677,409 | 7/1972 | Ferm et al. | 210/195 M |
| 3,764,011 | 10/1973 | Owens | 210/192 |
| 3,835,039 | 9/1974 | Ciambrone | 210/260 X |
| 3,836,464 | 9/1974 | Brookins et al. | 210/446 X |
| 3,850,808 | 11/1974 | Hoermann | 210/195 M |
| 3,907,672 | 9/1975 | Milne | 210/195 M X |

*Primary Examiner*—Frank A. Spear, Jr.
*Assistant Examiner*—Robert H. Spitzer
*Attorney, Agent, or Firm*—Charles S. McGuire

[57] ABSTRACT

An improved sewage treatment system including a horizontally elongated tank divided transversely into a primary, aeration compartment, a secondary, settling compartment and a tertiary, filtering compartment. In a first aspect of the invention, overflow of treated effluent from the tank enters a further treatment section, which may constitute a longitudinal extension of the tank, wherein the effluent is constrained by baffles to flow in an elongated path while having chlorine or ozone mixed therewith to provide further purification. Another aspect of the invention resides in the novel structure of the filtering section wherein filter screens of different guage or opening size are used to achieve a greater degree of purification.

6 Claims, 6 Drawing Figures

SEWAGE TREATMENT SYSTEM

BACKGROUND OF THE INVENTION

The present invention relates to sewage treatment and, more specifically, to treatment apparatus suitable for installation and use with single or small multi-unit dwellings for converting raw sewage to harmless effluent.

The sewage treatment system disclosed in U.S. Pat. No. 3,677,409 includes a tank divided into aeration and settling compartments with means for returning sludge from the latter to the former. Also, a filtering screen with continuous backwash means to prevent clogging is provided, together with skimmer means for removing foam and flowing solid materials from the settling compartment and returning them to the aeration compartment. The tank is molded Fiberglas, bulbous in shape, of circular cross section as viewed from above.

Although the sewage treatment apparatus described above provides a number of desirable features, there are still some areas of objection. For example, the cost of molds for the plastic tanks makes the unit cost very high in limited quantities. Also, the shape of the tank requires deep excavation in relation to tank volume for underground installation, which is also very expensive or unfeasible in some locations. Finally, while the effluent is relative pure and free of pollutants, it requires discharge into a sand filter bed, or the like, being unsafe for discharge into a natural waterway.

Accordingly, it is a principal object of the present invention to provide a sewage treatment system of high efficiency, i.e., which converts raw sewage to extremely pure effluent.

A further object is to provide a high efficiency sewage treatment system which is economical in manufacture and below-ground installation relative to its capacity.

Another object is to provide a sewage treatment system having improved means for filtering solids to produce a purified effluent.

Other objects will in part be obvious and will in part appear hereinafter.

SUMMARY OF THE INVENTION

The present invention utilizes desirable features of prior art systems, such as that shown in aforementioned U.S. Pat. No. 3,677,409, while adding, eliminating or modifying other features to produce a novel and improved system.

The apparatus includes an elongated tank, preferably cylindrical in shape, for underground installation with its long axis horizontal when in use. The major portion of the tank's length, extending from the inlet end thereof to a transverse dividing wall, is designated the aeration compartment and includes a plurality of diffusers near the bottom through which air bubbles are injected into the sewage as it flows from the inlet to pass over the upper edge of the dividing wall into the settling compartment. Foam and floating solids, as well as solids which settle to the bottom, are removed from the settling compartment be being pumped through a tube, and returned to the inlet end of the aeration compartment.

From the settling compartment the liquid sewage passes through one or more filtering screens, one of which is provided with a water jet backwash to prevent clogging. The screen or screens separate the settling compartment from a tertiary compartment at the outlet end of the tank. An outlet opening, at a vertical position slightly below that of the inlet opening, is provided in the opposite end wall, at or near one side thereof.

Liquid sewage passing through the tank outlet opening enters a further treatment section having a series of vertical baffles. The sewage flows alternately under and over the baffles in following the elongated path established thereby to the final discharge opening at the opposite side of the section. A plurality of additional diffusers are provided in the final treatment section in each area where the sewage passes under a vertical baffle, in applications where the further treatment process includes mixing ozone with the sewage. The ozone is generated by passing air through a chamber containing an ultraviolet lamp, in association with the final treatment section.

The final treatment section may comprise essentially an axial extension of the tank, having the same cross-sectional dimensions. The arrangement of the inlet and outlet and the vertical baffles in the final treatment section is such that an elongated flow path is established laterally of the tank axis. Thus, the final treatment section, while purifying the effluent to the extent that it is acceptable in most instances for discharge directly into natural waterways, adds only a fraction to the cost and size of the tank.

DETAILED DESCRIPTION

Figure 1:
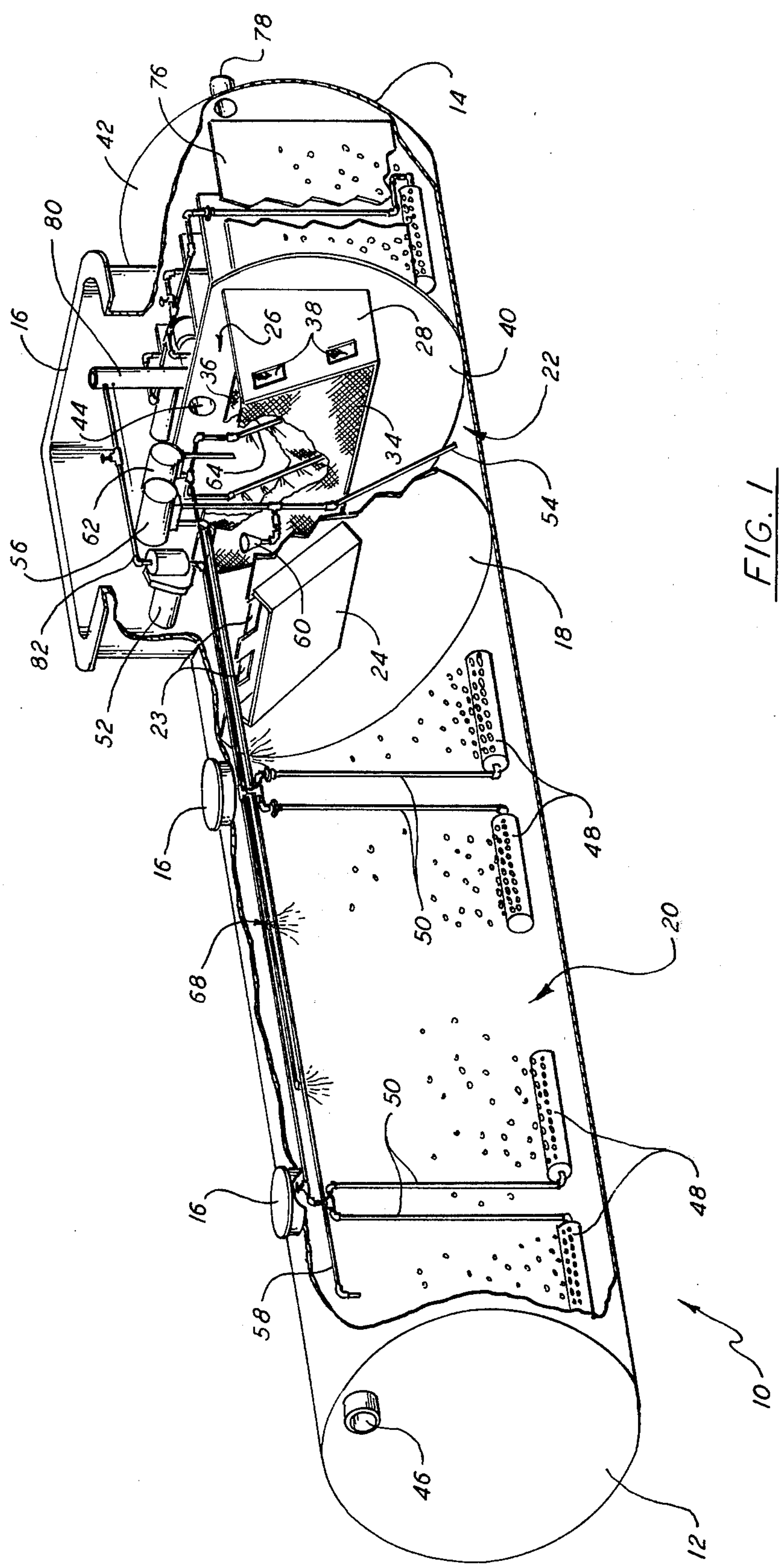
FIG. 1 is a perspective view, with portions broken away, of a first embodiment of apparatus embodying the invention.

The sewage is contained during the processing operation within tank 10, preferably cylindrical in cross-section and horizontally elongated to permit underground installation with minimum excavation depth. Tank 10 may comprise a steel cylinder having closed ends 12 and 14 of a type commonly fabricated in many standard sizes. Manhole fittings 16 of appropriae diameter are provided at various locations along the top of tank 10 for access to interifor portions.

Inclined dividing wall 18 separates the interior of tank 10 into a primary, or aeration chamber 20 and a secondary, or settling chamber 22. Wall 18 extends from the bottom of tank 10 to an upper edge, preferably including adjustable wiers 23, defining an overflow for aerated sewage from chamber 20 chamber 22. Baffle 24 is attached to wall 18 to retard overflow of floating solids.

Tertiary chamber 26 is formed by side walls 28 (FIG. 1) and 30 (FIG. 2) and bottom 32, all extending from wall 40, and filter screens 34 and 36. Screen 34 is coarser, i.e., has larger openings, than screen 36 so that liquid is filtered in two stages in passing from secondary compartment 22 to tertiary compartment 26. Side walls 28 and 30 each include openings 38 in the portions thereof between screens 34 and 36, and bottom wall 32 extends only from wall 40 to screen 36, whereby the bottom is open between the screens. Both of screens 34 and 36 may be economically formed of plastic, the coarse screen comprising merely a perforated sheet of a suitable plastic, and the finer screen preferably woven from plastic fibers. Suitable sizes of the openings are, by way of example, 0.064 for screen 34 and 0.011 for screen 36. The screens are preferably supported for sliding movement into and out of suitable guideways, or the like, on side walls 28 and 30 to provide rapid and convenient removal and replacement. Vertical wall 40 separates tertiary chamber 26 from final treatment chamber 42, with which it communicates through opening 44.

Raw sewage enters tank 10 through inlet 46 in end wall 12 and flows toward the opposite end of the tank. As it does so, air is injected through ceramic diffusers 48, connected by lines 50 to air pump or compressor 52. Diffusers 48 are of conventional construction and release the air in small bubbles for maximum contact of the oxygen content with the sewage to stimulate growth of aerobic bacteria, thereby enhancing decomposition of the sewage.

When the level of aerated, and thus partly decomposed, sewage within chamber 20 is high enough it flows over the upper edge of wall 18 into settling chamber 22. Sludge, i.e., particles having a higher specific gravity than water, settles to the bottom of chamber 22. Pipe 54 extends from an open end at or near the lowermost point in chamber 22 to sludge pump 56. Both sludge pump 56 and air pump 52 preferably include automatic timers, since perpetual operation is not required. Sludge is thus removed from the bottom of settling chamber 22 and returned through pipe 58 for discharge near the inlet end of aeration chamber 20 to again be subject to the aeration and decomposition process as it flows back toward wall 18. Skimmer bowl 60 is adjustably positioned near the surface of sewage within chamber 22, and is connected to sludge pump 56 in the same manner as pipe 54, for removal of floating solids and foam.

Opening 44 is at a lower level than the upper edge of wall 18, so that sewage flows from secondary chamber 22, through screens 34 and 36, to tertiary chamber 26. In so doing, solids of larger size than the screen mesh are filtered out. In order to prevent frequent clogging of the finer screen 36, a backwash system is provided. Water is pumped by spray pump 62 to line 64 and discharged through nozzles adjacent the downstream side of screen 36. Thus, solids are washed off the screen, and may settle to the bottom of settling chamber 22.

Since flow is generally in the direction of the long axis of tank 10, the sewage or effluent tends to flow through screen 34 before reaching screen 36 rather than entering the space between the screens by flowing laterally through openings 38 or upwardly through the open bottom in this section. Any solids blocked by screen 34 tend to settle by gravity from the surface of the screen to the bottom of compartment 22. Also, backwashing of screen 36 creates some reverse flow tending to dislodge solids from screen 34, although this screen establishes a baffle preventing a large amount of turbulence within compartment 22 which would interfere with free gravity settling. Openings 38 provide a lateral flow path to the foward surface of screen 36 in the event screen 34 becomes too clogged with solids for sufficient longitudinal flow. Solids washed from screen 36 during backwashing may settle out of the space between the screens through the open bottom. Spray pump 62 takes its inlet from tertiary chamber 26 via line 66 and discharges both through the screen backwash nozzles attached to line 64, and appropriately positioned nozzles on line 68 to cut the foam on the surface of sewage in aeration chamber 20.

Sewage passing through opening 44 into final treatment section 42 has passed through aeration chamber 20 at least once, settling chamber 22 where both floating and non-floating solids are removed and returned to the aeration chamber, and through screens 34 and 36, where smaller solids are removed. The effluent undergoes further treatment for additional purification within chamber 42, as explained later in more detail.

Figure 3:
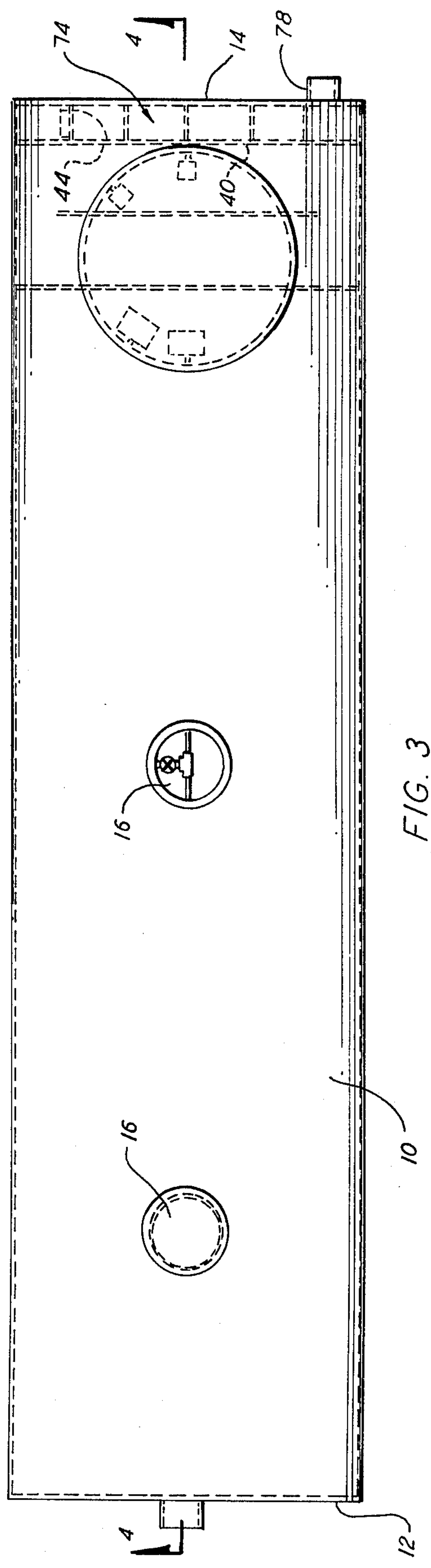
FIG. 3 is a plan view of another embodiment of the apparatus.
Figure 4:
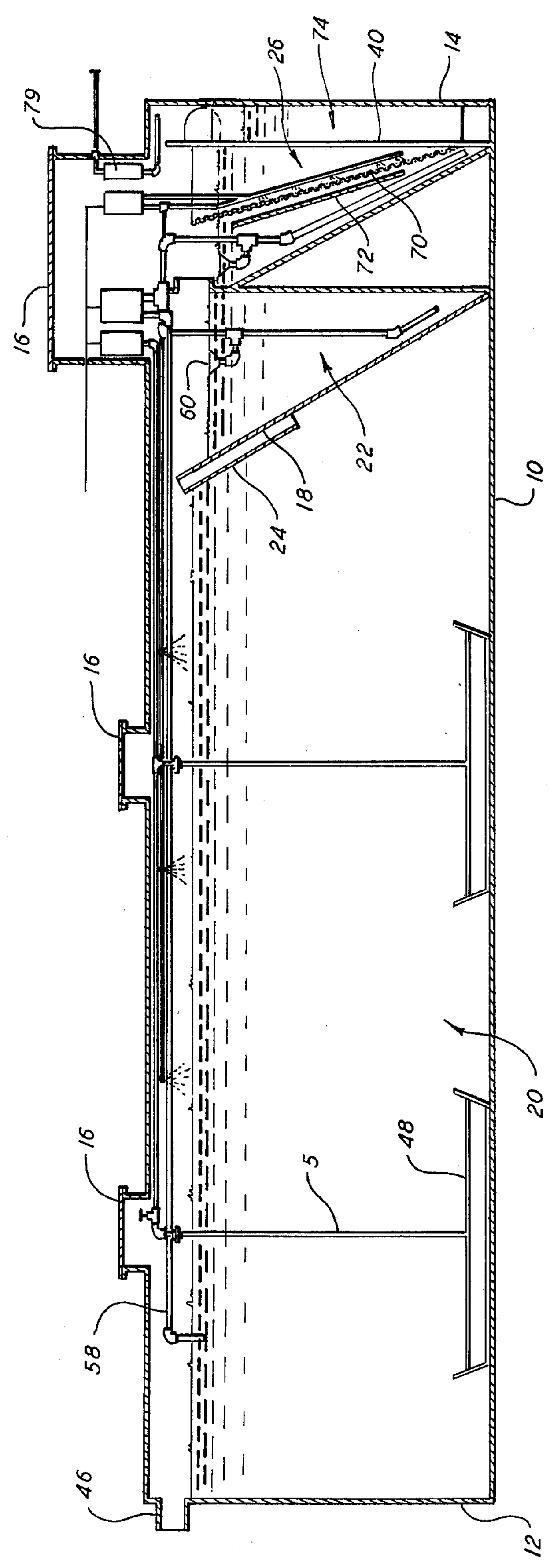
FIG. 4 is an elevational view of the apparatus of FIG. 3 in section on the line 4—4 thereof.

Turning now to the embodiment of FIGS. 3 and 4, the construction is largely the same as the previously described embodiment except for the more conventional filter screen arrangement, and the final treatment chamber. Common reference numerals are used for elements which correspond to the same or similar elements of the previous embodiment. Tank 10 includes primary, aeration compartment 20, secondary, settling compartment 22, and tertiary, filtering compartment 26. Diffusers 48, although of a different configuration than those of the FIG. 1 embodiment, are also of standard, commercially available construction, and function in the same manner. Sludge return line 54 and adjustable skimmer 60 likewise serve the same purpose and operate in the same manner as in the previous embodiment. Screen 70 extends from above the surface of the effluent substantially to the bottom of tank 10 at wall 40. All effluent must pass through screen 70 in flowing from secondary compartment 22 to tertiary compartment 26. Baffle plate 72 is positioned a short distance from screen 70 to prevent spray from the backwash nozzles in line 64 from creating undue turbulence which could interfere with the settling of solids in compartment 22.

Final treatment chamber 74 is provided for further treatment and purification of effluent leaving compartment 26 through opening 44. Chambers 42 and 74 of the two disclosed embodiments are the same in purpose, the former injecting ozone in much the same manner that oxygen is injected in aeration compartment 20, and the latter adding chlorine in controlled quantities. In either case, a series of vertical baffles are provided to constrain the flow of effluent through the chamber in an elongated path laterally of the tank axis.

Figure 5:
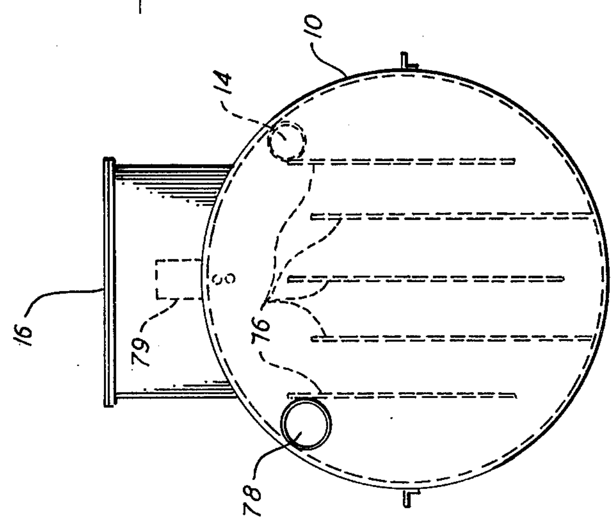
FIG. 5 is an end view of the apparatus, as seen from the right end of FIGS. 3 and 4.

Chamber 74 of the FIGS. 3 and 4 embodiment is shown in end elevation in FIG. 5. Chamber 42 of the FIGS. 1 and 2 embodiment is shown in end elevation in FIG. 6. In both embodiments vertical baffles 76 extend between walls 14 and 40. It will be noted that baffles having a lower edge above the bottom of chambers 42 and 74 and an upper edge above the surface of the effluent within the chamber alternate with baffles having a lower edge contacting the bottom of the chamber and an upper edge below the effluent surface. Opening 44, through which effluent enters chambers 42 and 74, is positioned on one side of all of baffles 76, and tank outlet 78 is positioned on the opposite lateral side of all baffles, in end wall 14. Thus, effluent entering through opening 44 flows generally laterally across chambers 42 and 74, and in an elongated path, first under one baffle, then over another, and so on, from right to left as seen in FIGS. 5 and 6.

The embodiment of FIGS. 3, 4 and 5 includes chlorinator unit 79, which may be of standard commercial design such as the Sanuril Model 200 Washwater Chlorinator of Diamond Shamrock Corporation. Such units are suitable for disinfecting effluent in aerobic treatment plants having a design capacity of 1,500 gallons per day, or less. Chlorinator unit 79 is used in conjunction with tablets which provide a chemically stable source of chlorine for wastewater disinfection.

Figure 6:
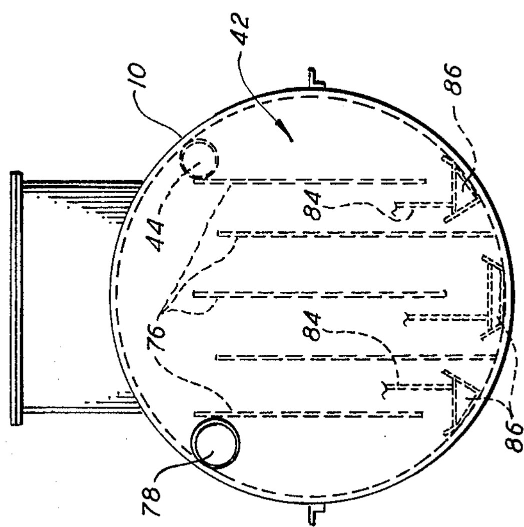
FIG. 6 is an end view, as seen from the right end of FIG. 2.
Figure 2:
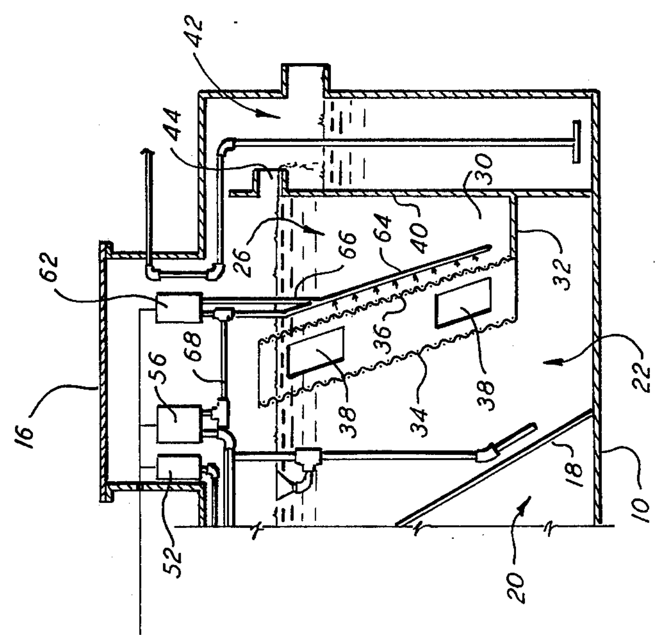
FIG. 2 is a fragmentary, elevational view, in half section, of a portion of the apparatus of FIG. 1.

In the embodiment of FIGS. 1, 2 and 6, a special ozone generator is provided to produce ozone for injection into the effluent flowing through chamber 42. Waterproof tube 80 contains ultraviolet lamp which is connected to an appropriate power source through waterproof connector fittings. Air pump 52, besides supplying air to diffusers 48, also pumps air through line 82 into tube 80. As the air passes through the tube, ultraviolet radiation transforms a substantial portion of the oxygen into ozone. The ozone-containing air is discharged through pipes 84 to diffusers 86, preferably of aluminum oxide rather than ordinary ceramic to prevent rapid deterioration from contact with the ozone. It will be noted in FIG. 6 that three ozone diffusers are provided, one below each of the baffles having a lower edge above the bottom of chamber 42. Thus, the injected air containing the ozone rises from diffusers 86 on each side of all baffles. The diffusers may be of any desired configuration, including the cylindrical form of diffusers 48 in FIG. 1.

The enhanced aerobic action produced by ozne contact within the final treatment chamber purifies the effluent to the extent that it is safe to discharge directly into natural waterways under most circumstances, rather than into a sand filter bed, as is required when the same treatment system is used without the final treatment section. It is also to be noted that the size and cost of the entire treatment system are not appreciably increased by the addition of the final treatment section.

Although the capacity of the system is not a limiting factor, it is envisioned that systems of this type will operate and may be economically supplied in tank capacities ranging from about 1200 to 12,000 gallons which, under normal circumstances, should process and purify all sewage and like wastes for dwelling units housing as many as 100 persons.

What is claimed is:

1. A sewage treatment system comprising in combination:

a. an enclosed, horizontally elongated tank of substantially uniform cross section between two end walls having an inlet opening in one end wall and an outlet opening in the opposite end wall;

b. an internal wall extending across the interior of said tank from the bottom thereof to an upper edge slightly below the level of the lowest edge of said inlet opening, dividing said tank into first and second compartments;

c. a first filter screen extending partially across the interior of said tank on the side of said internal wall nearest said opposite end wall;

d. a second filter screen arranged in substantially parallel, spaced relation to said first screen on the side thereof nearest said opposite end wall;

e. both of said filter screens having upper edges higher than the level of the lowest edge of said outlet opening, lower edges substantially higher than the bottom of said tank and lower than said outlet opening and coplanar side edges;

f. a pair of solid side walls extending from said opposite end wall to the side edges of both of said first and second screens, and a bottom wall extending from said opposite end wall only to the lower edge of said second screen whereby said side and bottom walls, said second screen and said opposite end wall define a third compartment;

g. said side walls having openings in the portions thereof between the side edges of said first and second screens, the area of said openings being sufficiently small that normal flow is essentially longitudinal, through said first screen, and sufficiently large to permit essentially unobstructed lateral flow to the space between said first and second screens in the event of blockage of said first screen; and h. means within said first compartment for aerating liquid contents thereof, whereby sewage flowing through said tank from said inlet to said outlet openings is aerated in said first compartment, partially purified by gravity settling of a portion of the solids in said second compartment, and further purified by filtration through said screens in passing from said second to said third compartment.

2. The invention according to claim 1 wherein said first screen is coarser than said second screen.

3. The invention according to claim 2 and further including a fourth compartment arranged to receive liquid discharged from said third compartment through said outlet opening in said opposite end walls, said fourth compartment including a final discharge opening and a plurality of baffles defining an elongated, gravity flow path for liquid from said outlet opening to said final discharge opening.

4. The invention according to claim 3 and further including means for injecting an effluent purifying agent into said fourth compartment.

5. The invention according to claim 1 and further including a plurality of liquid spray nozzles arranged within said first compartment above the level of said inlet opening to direct a foam-cutting spray downwardly upon the surface of liquid in said first compartment, and a line for supplying liquid to said nozzles from said third compartment.

6. The invention according to claim 1 and further including backwash jet means disposed within said third compartment to direct a spray of liquid on the side of said second screen facing said opposite end wall, and a line for supplying liquid to said jet means from said third compartment.

* * * * *